(12) United States Patent
Schmidt et al.

(10) Patent No.: US 7,169,073 B2
(45) Date of Patent: Jan. 30, 2007

(54) POWERTRAIN WITH ELECTRICALLY VARIABLE TRANSMISSION

(75) Inventors: Michael R. Schmidt, Carmel, IN (US); Donald Klemen, Carmel, IN (US); Alan G. Holmes, Clarkston, MI (US)

(73) Assignee: General Motors Corporation, Detroit, MI (US)

( * ) Notice: Subject to any disclaimer, the term of this patent is extended or adjusted under 35 U.S.C. 154(b) by 136 days.

(21) Appl. No.: 11/035,183

(22) Filed: Jan. 13, 2005

(65) Prior Publication Data

US 2006/0154772 A1    Jul. 13, 2006

(51) Int. Cl.
    *F16H 3/72*    (2006.01)
(52) U.S. Cl. .................. 475/5; 475/279; 475/282; 475/290; 475/330
(58) Field of Classification Search ............... 475/290, 475/282, 5, 279, 275, 330; 180/65.2, 65.3, 180/65.4; 903/909, 910, 911; 477/3
See application file for complete search history.

(56) References Cited

U.S. PATENT DOCUMENTS 5,730,676 A * 3/1998 Schmidt ..................... 475/5
6,953,409 B2 * 10/2005 Schmidt et al. ............. 475/5

* cited by examiner

*Primary Examiner*—Charles A. Marmor
*Assistant Examiner*—Derek D. Knight
(74) *Attorney, Agent, or Firm*—Dan L. Thompson

(57) ABSTRACT

A hybrid powertrain incorporates an engine, two motor/generator units and three planetary gearsets along with three torque-transmitting mechanisms to provide a two-mode compound-split electrically variable transmission.

5 Claims, 4 Drawing Sheets

POWERTRAIN WITH ELECTRICALLY VARIABLE TRANSMISSION

TECHNICAL FIELD

This invention relates to hybrid powertrains and, more particularly, to hybrid powertrains having electrically variable transmissions.

BACKGROUND OF THE INVENTION

Passenger vehicles and trucks incorporate a powertrain having a multi-speed transmission. Generally, these transmissions have been planetary or countershaft-type transmissions providing a multitude of ratios somewhere between two and seven ratios.

To reduce the number of ratio interchange events, it has been considered that variable ratio transmissions would be advantageous. Variable ratio transmissions have continuous ratio changes, such that the event of a ratio interchange is not evident. These variable transmissions or continuously variable transmissions (CVTs) have taken the form of hydraulically variable units, electrically variable units, and friction belt units. These transmissions lend themselves well to improve fuel economy and vehicle performance.

SUMMARY OF THE INVENTION

It is an object of the present invention to provide an improved powertrain having an electrically variable transmission.

In one aspect of the present invention, the electrically variable transmission (EVT) has three planetary gearsets and two motor/generator (M/G) units, as well as an engine input.

In another aspect of the present invention, the planetary gearsets and the friction devices controlling the planetary gearsets are disposed inwardly of the M/G units.

In yet another aspect of the present invention, one rotating friction mechanism and two stationary friction mechanisms are incorporated within the transmission.

In still another aspect of the present invention, one of the stationary friction devices provides a first mode of operation and the rotating friction device provides a second mode of operation.

In yet still another aspect of the present invention, the electrically variable transmission has two mechanical points wherein one of the M/G units is stationary.

In a further aspect of the present invention, the M/G units cooperate with the engine power to provide a compound-split EVT.

In a yet further aspect of the present invention, a first of the M/G units operates as a generator and the second M/G unit operates as a motor during a first phase of operation up to a first mechanical point.

In a still further aspect of the present invention, a first of the M/G units switches from a motor-to-generator operation and the second M/G unit switches from a generator-to-motor operation at the point where the first phase and second phase of operation are changed and the torque-transmitting mechanisms are interchanged.

In yet a still further aspect of the present invention, during the second phase of power transmission from a mechanical point to maximum output, the first M/G unit operates as a motor and the second M/G unit operates as a generator. In both phases of operation, a compound-split powertrain is provided.

DESCRIPTION OF THE EXEMPLARY EMBODIMENTS

Figure 1:
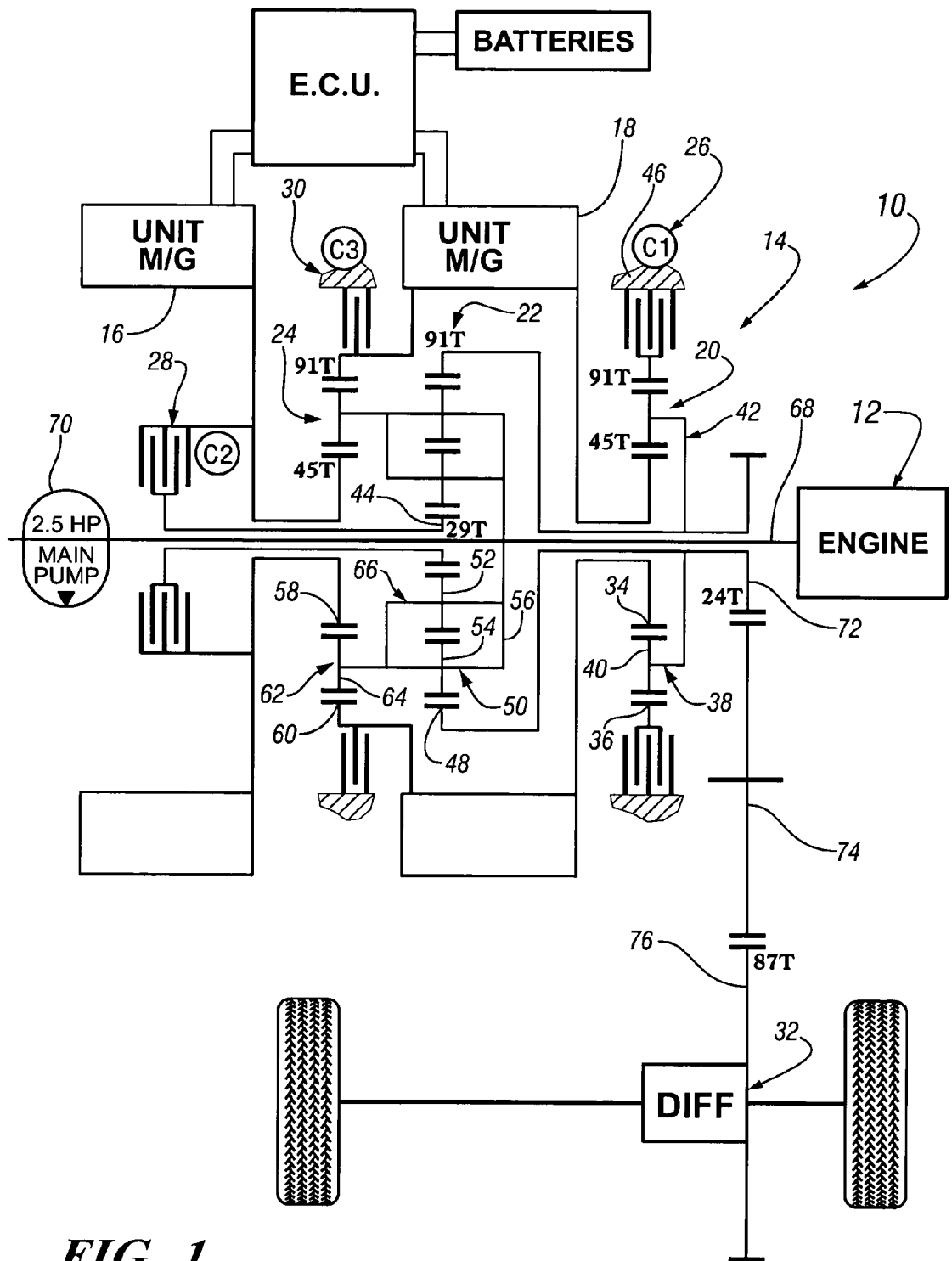
FIG. 1 is a schematic representation of a powertrain incorporating the present invention.
Figure 2:
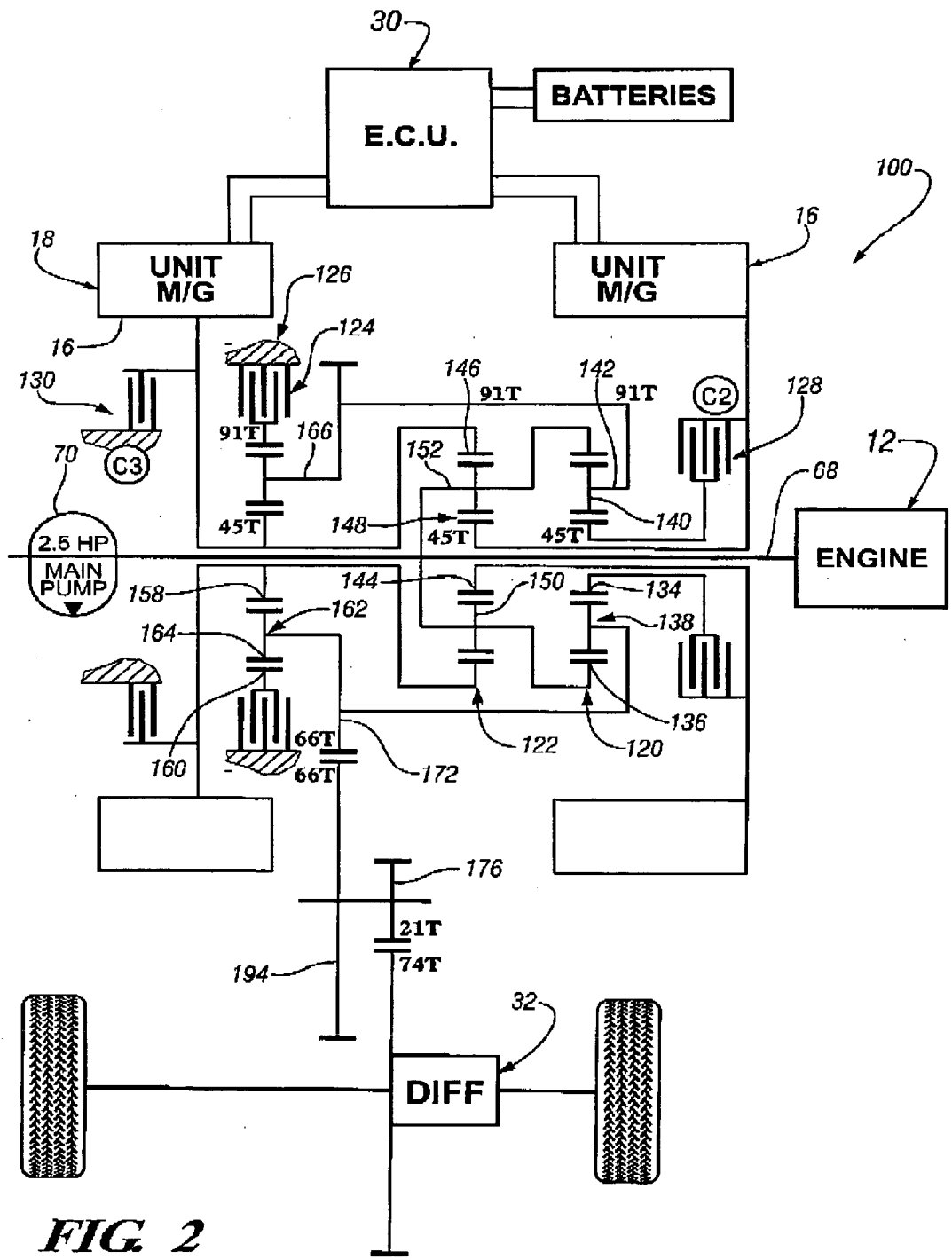
FIG. 2 is a schematic representation of another embodiment of a powertrain incorporating the present invention.

Referring to the drawings, wherein like characters represent the same or corresponding parts throughout the several views, there is seen in FIG. 1 a hybrid powertrain 10 having an internal combustion engine 12 and an electrically variable transmission (EVT) 14. The engine 12 is a conventional power source or prime mover.

The EVT 14 includes two motor/generator (M/G) units 16 and 18, which are interconnected by an electronic control unit (ECU). The ECU is connected with a plurality of conventional batteries, which are adapted to supply power when necessary and absorb power when necessary. The batteries in effect are storage devices for electrical energy. The EVT 14 also includes three interconnected planetary gearsets 20, 22, and 24 and three torque-transmitting mechanisms 26, 28, and 30.

The EVT 14 also includes a conventional differential output mechanism 32, which is adapted to connect to the drive wheels of a vehicle in which the powertrain is to be incorporated. The powertrain 10 is primarily fashioned to operate in front wheel drive vehicles and the engine 12 is sized for a small vehicle having a GVW of approximately 4800 pounds. The engine size and vehicle size are not limitations of the present invention but are presented merely by way of example.

The planetary gearset 20 includes a sun gear member 34, a ring gear member 36, and a planet carrier assembly member 38, which includes a plurality of pinion gears 40 rotatably supported on a planet carrier or cage 42 and rotatably meshing with the sun gear member 34 and ring gear member 36.

The planetary gearset 22 includes a sun gear member 44, a ring gear member 48, and a planet carrier assembly member 50. The planet carrier assembly member 50 includes a plurality of meshing pinion gears 52 and 54 rotatably supported on a planet carrier member 56 and meshing with the sun gear member 44 and ring gear member 48, respectively.

The planetary gearset 24 includes a sun gear member 58, a ring gear member 60, and a planet carrier assembly member 62, which includes a plurality of pinion gears 64 rotatably mounted on a planet carrier member 66 and disposed in meshing relationship with both the sun gear member 58 and the ring gear member 60. The planetary gearsets 20 and 24 are simple planetary gearsets, while the planetary gearset 22 is a compound planetary gearset.

The ring gear member 36 is operatively connected with the torque-transmitting mechanism 26 which, when engaged, is effective to hold the ring gear member 36 stationary at a transmission housing 46. The sun gear member 34 is continuously connected with the M/G unit 18. The carrier 38 is continuously connected with the ring gear member 48 of the planetary gearset 22. The sun gear member 44 is operatively connected with the torque-transmitting mechanism 28, which is also operatively connected with the sun gear member 58. When the torque-transmitting mechanism 28 is selectively engaged, the sun gear members 44 and 58 are drivingly interconnected.

The planet carrier member 56 is drivingly connected with a transmission input shaft 68, which is connected with the engine 12. The input shaft 68 also drives a conventional lubrication or hydraulic pump 70. The carrier 56 is also connected with the carrier 66 and therefore both the carriers 56 and 66 are continuously rotated whenever the engine 12 is operating.

The ECU is a conventional electronic unit which transmits signals and power between the M/G units 16 and 18 and the batteries. The ECU generally includes a programmable digital computer, which is operable to provide control signals to the M/G units to establish the speed and power generated therein.

The ring gear member 48 and the planet carrier member 42 are continuously interconnected and also connected with an output gear 72, which meshes with a transfer gear 74 that in turn meshes with an output gear 76 that is effective to drive the differential 32 in a conventional manner.

The ring gear member 60 is continuously connected with the M/G unit 18 and also operatively connected with the torque-transmitting mechanism 30. The torque-transmitting mechanism 30 is the subject matter of U.S. Ser. No. 10/843,903, filed May 12, 2004 and assigned to the assignee of the present application. As can be determined by reviewing that patent application, the torque-transmitting mechanism 30 is engaged to hold the M/G unit 18 stationary and also hold the ring gear member 60 stationary. In this condition, a cruise operation is employed, which saves fuel. Also during cruise operation, the M/G unit 16 may be employed to assist in the power output of the powertrain 10 and both torque-transmitting mechanisms 28 and 30 may be engaged.

Figure 3:
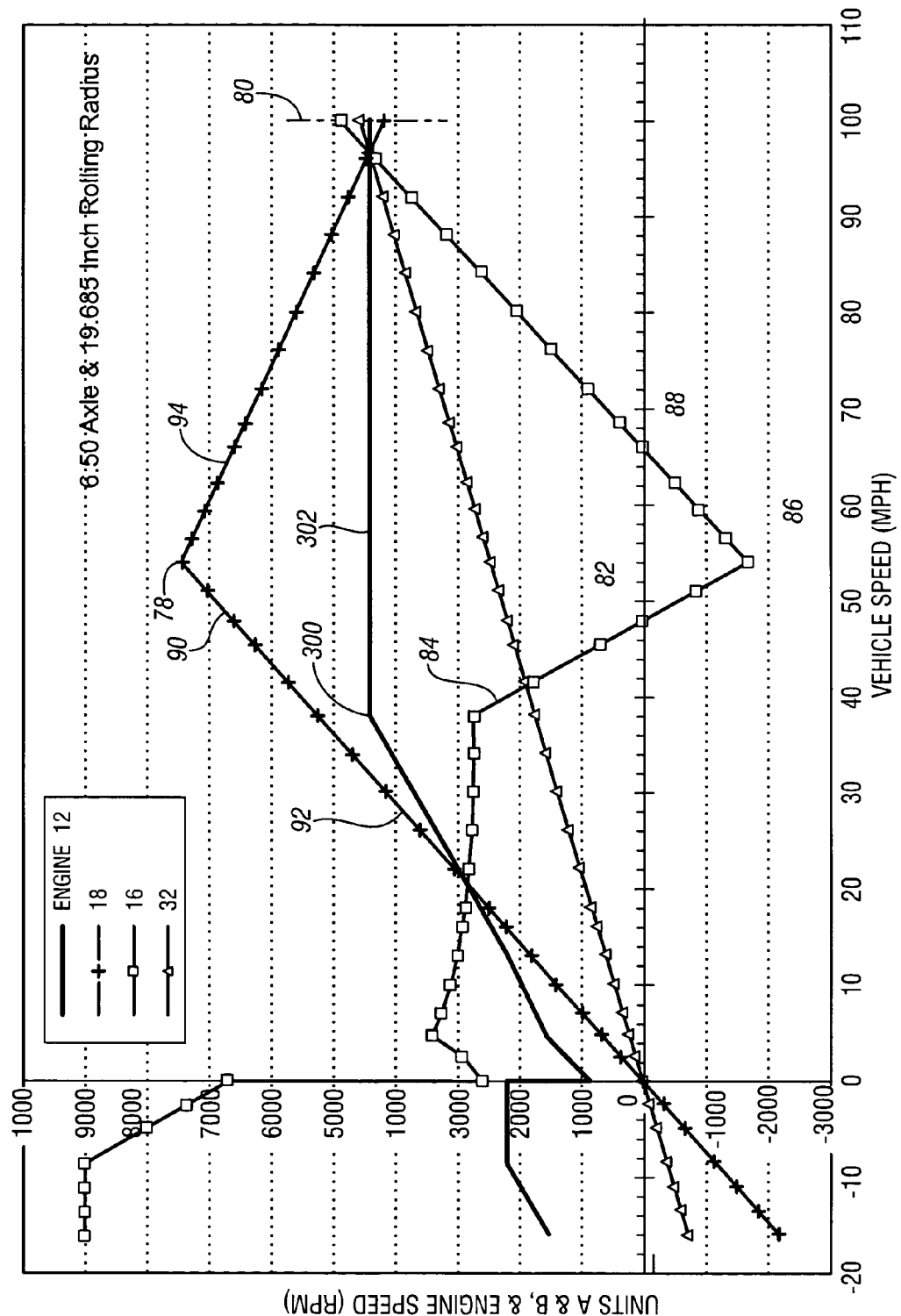
FIG. 3 is a curve showing the operation of the powertrain during a continuous pull operation.

The torque-transmitting mechanisms 26 and 28 establish two modes of operation, as shown in the curve of FIG. 3. In this curve, it is seen that the torque-transmitting mechanism 26 is engaged from a zero speed up to a point 78. At the point 78, the torque-transmitting mechanisms 26 and 28 are interchanged synchronously and the powertrain is operated out to the maximum speed at point 80.

During the operation from zero speed to point 78, the M/G unit 16 operates as a generator from zero speed to a point 82 around a curve 84. From the point 82 to point 86, the M/G unit 16 operates as a motor, and from the point 86 to point 88, the M/G unit 16 operates as a generator. From point 88 to the maximum speed point 80, the M/G unit 16 operates as a motor.

From the zero speed to a point 90, the M/G unit 18 operates as a motor along line 92. From the point 90 to the point 78, the M/G unit 18 operates as a generator; from the point 78 to point 94, the M/G unit 18 operates as a motor; and from the point 94 to the maximum speed point 80, the M/G unit 18 operates as a generator. At the points 82 and 88, which are mechanical speed points, the transmission has the highest efficiency and may be determined by selecting proper sun/ring gear ratios to establish the mechanical points at desired speed values.

The curve shown in FIG. 3 is indicative of the vehicle with the engine operating at approximately 4400 rpm, which is at a throttle setting less than full throttle. This is typical of general highway operation or when the vehicle is either in an acceleration phase or in a hill climbing phase. As previously mentioned, if the vehicle is to operate at a cruise condition, the torque-transmitting mechanism 30 and the torque-transmitting mechanism 28 could be engaged simultaneously.

At the mechanical speed point 82, the sun gear member 58 is stationary with the M/G unit 16 and the ring gear member 36 is stationary with the torque-transmitting mechanism 26. At this condition, the engine drives the output gear 72 through the planetary gearset 22 and the M/G unit 18 rotates at a speed determined by the planetary gearset 20 to correspond with the speed of the output gear 72.

At the mechanical speed point 88, the speed of M/G unit 18 is again zero and is connected with both the sun gear member 44 and the sun gear member 58. Under this condition, the engine 12 drives the carrier 66, which in turn rotates the ring gear member 48 and the output gear 72. This is a mechanical drive shaft. Since the torque-transmitting mechanism 26 is disengaged, that is no reaction is in the planetary gearset 20 and therefore the M/G unit 18 does not provide any input power to the drive train.

The hybrid powertrain 100 includes the engine 12, the M/G units 16 and 18, and three planetary gearsets 120, 122, and 124 as well as three torque-transmitting mechanisms 126, 128, and 130. The planetary gearset 120 includes a sun gear member 134, a ring gear member 136, and a planet carrier assembly member 138, which has a plurality of pinion gears 140 rotatably disposed on a planet carrier member 142 and meshing with the sun gear member 134 and ring gear member 136.

The planetary gearset 122 includes a sun gear member 144, a ring gear member 146, and a planet carrier assembly member 148 having a plurality of pinion gears 150 rotatably disposed on a planet carrier member 152 and meshing with the sun gear member 144 and the ring gear member 146.

The planetary gearset 124 includes a sun gear member 158, a ring gear member 160, and a planet carrier assembly member 162, which has a plurality of pinion gears 164 rotatably disposed on a planet carrier member 166 and disposed in meshing relationship with the sun gear member 158 and the ring gear member 160.

The sun gear member 134 is operatively connectible with the M/G unit 16 through the torque-transmitting mechanism 128. The ring gear member 160 is operatively connected with a transmission housing through the torque-transmitting mechanism 126. The M/G unit 18 and the sun gear member 158 and the ring gear member 146 are operatively connectible with the transmission housing through the torque-transmitting mechanism 130.

The input shaft 68 is connectible between the engine 12 and both the planet carrier member 152 and the ring gear member 136 as well as the conventional hydraulic pump 70. The planet carrier member 142 is continuously connected with the planet carrier member 166 and also with an output gear 172, which meshes with a transfer gear 174, that is coupled with a transfer gear 176 meshing with an output gear 178 that in turn drives the differential mechanism 32.

The planetary gearsets 120, 122, and 124 are all simple planetary gearsets and are interconnected in a slightly different manner than the interconnections shown in FIG. 1, which is necessary because of the compound planetary gearset in FIG. 1. However, the planetary gearsets are designed to provide the same output performance curves shown in FIG. 3.

In the first mode of operation from zero speed to the point 78, the torque-transmitting mechanism 126 is engaged, and from the point 78 to the maximum speed point 80, the torque-transmitting mechanism 128 is engaged. The torque-transmitting mechanisms 126 and 128 are synchronously interchanged at the point 78. As with the powertrain 10 shown in FIG. 1, the powertrain 100 has two mechanical drive points shown as 82 and 88 in FIG. 3, which establish efficient operation at these speeds.

It will be appreciated by those skilled in the art that the points 82 and 88 can be moved along the speed curve and are dependent upon the speed of the engine as the vehicle is operated. As seen in FIG. 3, the engine speed begins at an idle point I and continues upward to a constant speed at point 300, as represented by curve 302.

Figure 4:
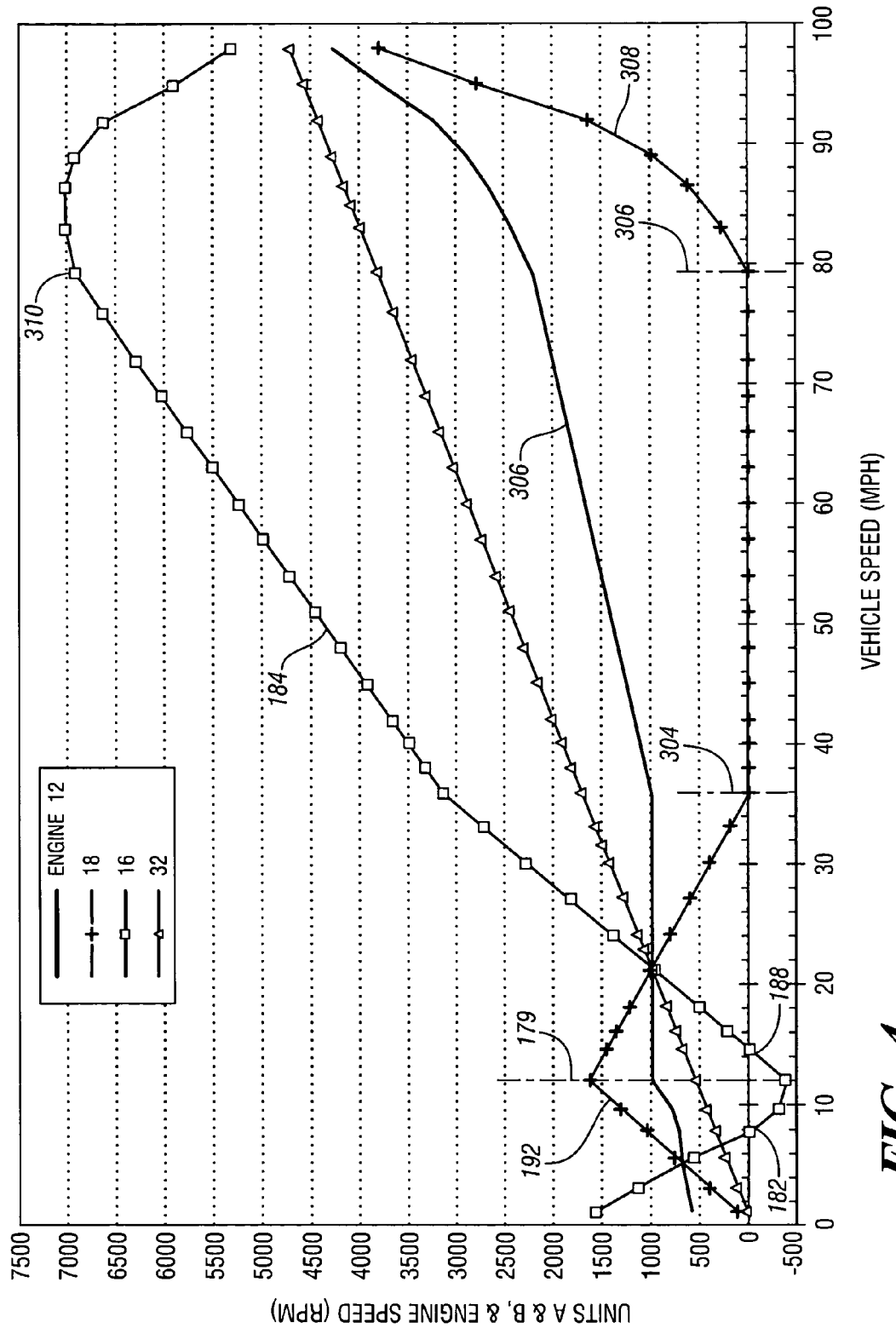
FIG. 4 is a series of curves depicting the performance of the powertrain shown in FIGS. 1 and 2 under normal road conditions.

In FIG. 4, the torque-transmitting mechanism 126 is engaged from zero speed up to a point 179 at which time it is swapped with the torque-transmitting mechanism 128. At a point 304, both of the torque-transmitting mechanisms 128 and 130 are engaged, which places the EVT in a cruise condition. That is, when the torque-transmitting mechanism 130 is engaged, the M/G unit 18 is held stationary as is the ring gear member 60/146. The torque-transmitting mechanisms 128 and 130 remain engaged to point 306 at which point the torque-transmitting mechanism 130 is disengaged. During the speed range between points 304 and 306, the engine 12 is the controlling speed for the vehicle as represented by line 308. During this speed range from point 304 to 306, the M/G unit 16 operates as a generator represented by line 184.

From the curve of FIG. 4, it can be seen that at the points 182 and 188 prior to the cruise speed range, the two mechanical speed points are achieved, such that the efficiency of the powertrain is highest at these two points as well as in the cruise range. The M/G unit 18 operates as a generator along line 192 from the zero speed to point 304. The M/G unit 18 is stationary from point 304 to point 306 as previously mentioned. From point 306 on upward in speed, the M/G unit 18 is again a generator represented by line 308.

The M/G unit 16 operates as a generator from the zero point to point 182, as a motor from point 182 to point 188, as a generator from point 188 to point 310, and as a motor from point 310 outward as the speed increases. Note that the engine 12 is accelerated from zero to point 179, remains substantially constant between the points 179 and 304 and is controlling as the output speed from point 304 outward to point 310, at which time both the engine and the M/G unit 16 cooperate to power through the planetary gearset 120.

The invention claimed is:

1. A powertrain having an electrically variable transmission comprising:
    a prime mover;
    a first motor/generator unit;
    a second motor/generator unit;
    a stationary transmission housing;
    first and second selectively engageable torque-transmitting mechanisms;
    first, second, and third planetary gearsets each having first, second, and third members;
    an input shaft interconnecting said prime mover with a first member of said second planetary gearset and a first member of said first planetary gearset;
    said second member of said second planetary gearset being continuously interconnected with said first motor/generator unit and selectively connectible with said second member of said first planetary gearset through said second selectively engageable torque-transmitting mechanism;
    said third member of said second planetary gearset being continuously interconnected with said second motor/generator unit;
    said first member of said third planetary gearset being continuously connected with said second motor/generator unit;
    said second member of said third planetary gearset being continuously drivingly connected with a transmission output;
    said third member of said third planetary gearset being selectively connectible with said transmission housing through said first torque-transmitting mechanism; and
    said first and second torque-transmitting mechanisms being selectively engaged to provide a first mode of transmission operation and a second mode of transmission operation respectively.

2. The powertrain having an electrically variable transmission defined in claim 1 further comprising:
    a third torque-transmitting mechanism selectively engageable to connect said second motor/generator unit with said transmission housing; and
    said third member of said first planetary gearset being continuously connected with said transmission output.

3. The powertrain having an electrically variable transmission defined in claim 1 further comprising:
    each of said planetary gearset consisting of a sun gear member, a ring gear member and a planet carrier assembly member having a plurality of pinion gear members rotatably mounted on a carrier member and meshing with both said sun gear member and said ring gear member.

4. The powertrain having an electrically variable transmission defined in claim 3 further comprising:
    said first member of said first planetary gearset being a carrier member, said second member of said first planetary gearset is a sun gear member, and said third member of said first planetary gearset is a ring gear member;
    said first member of said second planetary gearset is a carrier member, said second member of said second planetary gearset is a sun gear member, and said third member of said second planetary gearset is a ring gear member; and
    said first member of said third planetary gearset is a sun gear member, said second member of said third planetary gearset is a carrier member, and said third member of said third planetary gearset is a ring gear member.

5. The powertrain having an electrically variable transmission defined in claim 3 further comprising:
    said first member of said first planetary gearset being a ring gear member, said second member of said first planetary gearset is a sun gear member, and said third member of said first planetary gearset is a carrier member;
    said first member of said second planetary gearset is a carrier member, said second member of said second planetary gearset is a sun gear member, and said third member of said second planetary gearset is a ring gear member; and
    said first member of said third planetary gearset is a sun gear member, said second member of said third planetary gearset is a carrier member, and said third member of said third planetary gearset is a ring gear member.

* * * * *